Feb. 1, 1927.
L. M. ELLISON
1,615,871
MULTIPLE DRAFT GAUGE
Filed Feb. 3, 1926
2 Sheets-Sheet 1
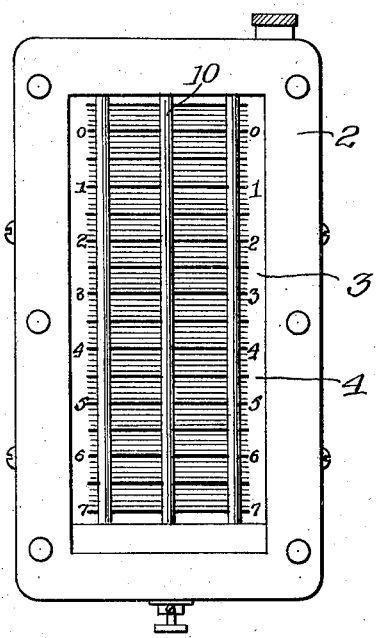
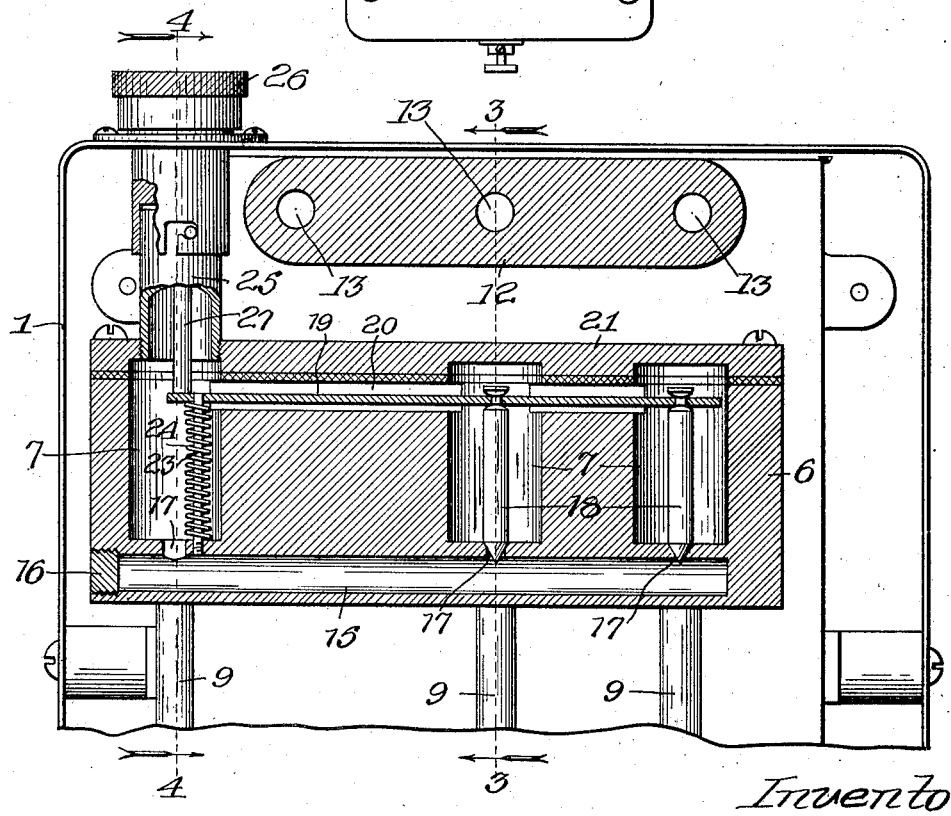
Inventor:
Lewis M. Ellison, Feb. 1, 1927.
L. M. ELLISON
1,615,871
MULTIPLE DRAFT GAUGE
Filed Feb. 3, 1926    2 Sheets-Sheet 2
Fig. 4.
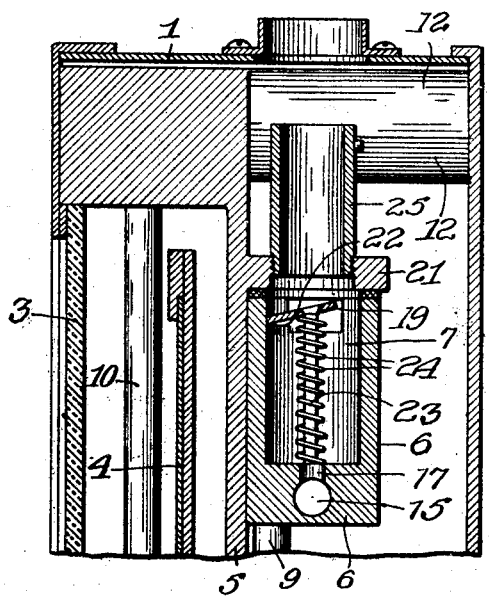
Fig. 3.
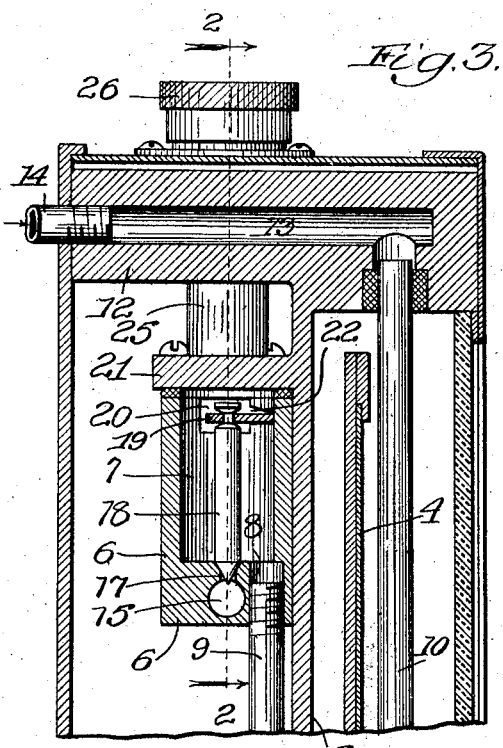
Fig. 5.
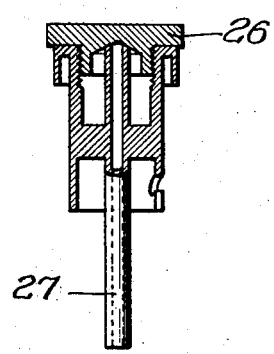
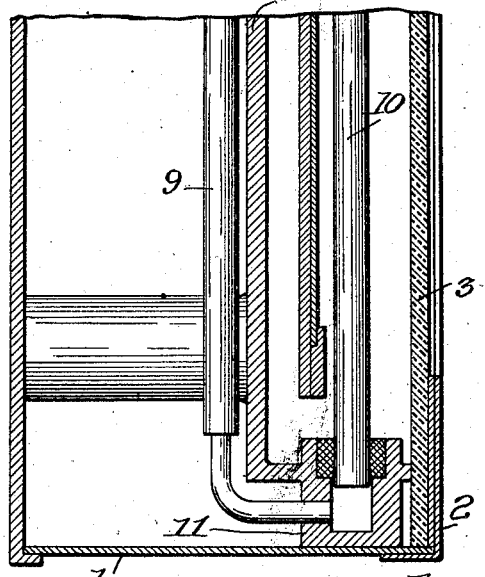
Inventor:
Lewis M. Ellison,
By Eugene Ewan
Atty Patented Feb. 1, 1927.

1,615,871

UNITED STATES PATENT OFFICE.

LEWIS M. ELLISON, OF CHICAGO, ILLINOIS.

MULTIPLE DRAFT GAUGE.

Application filed February 3, 1926. Serial No. 85,669.

This invention relates to multiple draft gauges for use with stoker furnaces for indicating pressure conditions at various points in the draft system.

The gauge of my invention has a plurality of liquid reservoir chambers, one for each of the gauge glasses.

The main object of my invention is to provide means whereby all of said chambers may be filled or be replenished with liquid simultaneously as from one of the same, and thus avoid the necessity of attending to the chambers separately as heretofore.

A further object of my invention is to provide valve means for normally closing the filling conduit between the several chambers so that in the operation of the gauge the pressure on the liquid in one gauge glass will not affect or disturb the level of the liquid in any other gauge glass, thereby making the gauge accurate in its readings.

A still further object of my invention is to operate the valve means through the vent or closure cap for one of the chambers, so that all the chambers will be automatically opened to the filling conduit on removing the cap, and closed on replacing the same.

The invention consists further in the matters hereinafter described and claimed.

In the accompanying drawings—

Fig. 1 is a front view of a multiple draft gauge embodying the features of my invention;

Fig. 2 is a vertical sectional view on line 2—2 of Fig. 3;

Figs. 3 and 4 are vertical sectional views on lines 3—3 and 4—4 of Fig. 2; and

Fig. 5 is a vertical sectional view of the vent cap removed from the gauge.

As shown in the drawings, my improved gauge has an outside casing 1 with a front cover 2 fitted with a glass or other transparent panel 3 so that the graduated chart 4 and associated gauge glasses behind the same may be seen, as in gauges of this general kind. This casting has a vertically disposed wall 5 behind the chart, as shown in Fig. 3.

To the rear of the wall 5 and adjacent the upper end thereof is a block 6, preferably made of metal. In this block are a plurality of upright chambers 7, 7 communicating by ports or openings 8, 8 in their lower ends with downwardly extending metal or other tubes 9, 9. These tubes are to the rear of the wall 5 and have their lower ends in communication with the lower ends of the upright gauge glass or other transparent tubes 10, 10 in front of the chart 4. The connection between the lower ends of these tubes is made through an intervening portion 11 of the casting, as shown in Fig. 3.

The gauge glasses 10, 10 extend to the top portion 12 of the casting and there open into passages 13, 13 in said top portion. These passages are connected by piping, such as 14, to the desired points in the draft system. The gauge has as many chambers 7 as there are points to be measured. In the drawings I have shown a three tube gauge.

Each chamber 7 has a separate set of tubes 9, 10 and their associated parts 13, 14, so that the pressure exerted on the column of liquid in one tube 10 will not affect the level of the column in any other tube. This is essential to accurate gauge operation for by having separate reservoir chambers 7 for the gauge tubes 10, the various pressures in the different tubes will not affect the accurate levels of the liquid columns in the tubes, as is brought about when the reservoir chamber is common to all the tubes.

The liquid in the tubes is usually a red or other colored oil and this is supplied from the chambers 7, 7. To fill or replenish these chambers with oil simultaneously from one point of filling and thus avoid the necessity of attending to each chamber separately as heretofore, I provide the following construction.

A filling conduit 15 is provided in the block 6 beneath the chambers 7, as shown in Fig. 2. When the block is of metal, this conduit is bored in the block from one of its ends and the bore closed at such end by a plug 16, as shown in Fig. 2. Port holes 17, 17 in the bottom walls of the chambers 7 open the same into the conduit 15. Two of the chambers 7 have valve members 18, 18 therein for opening and closing their ports 17. These valve members are in the form of needle like rods with pointed lower ends in the ports 17. The upper ends of the rods are connected with an actuating plate 19.

Plate 19 is disposed at the upper ends of the chambers 7 and extends lengthwise of the block from one chamber to the other so as to reach them all. The block has a slot like recess 20 in its upper portion to accommodate said plate and allow the same to lie below the cover 21 of the block. This cover 21, as best shown in Fig. 3, is integral with the wall 5 of the casting, and the block is screwed to it, as shown.

One side edge of the plate 19 fits in a V-shaped notch or groove 22 in one side of the slot 20 so that the plate may hinge up and down in opening and closing the valves 18, 18. An upright rod 23 is located in the chamber 7 free of a valve 18. This rod has its lower end screwed into the bottom wall of said chamber, while the upper end of the rod extends through an aperture or hole in the plate 19. A coil spring 24 surrounds the rod and raises the plate 19 to open the valves 18 whenever the plate is free to move upward. The upper edge of the V-groove 22 forms a stop for the plate to limit its upward movement, as shown in Fig. 4.

The chamber 7 containing the rod 23 is at one end of the block 6 and is most conveniently located for filling therethrough all of the chambers. This chamber has a filling neck 25 screwed into the cover 21, as shown in Fig. 2. Removably connected with this neck and extending above the same and out of the top of the casing 1 for accessibility is a vent cap 26 embodying the features of prior Patent No. 1,262,761, granted April 16, 1918.

Cap 26 carries a depending stem 27 which on being inserted into the neck on applying the cap thereto reaches down to and depresses the plate 19 to close the valves 18, 18 and close their respective chambers 7 to the filling passage 15, as shown in Figs. 2 and 3. On removing the cap 26, the spring 24 raises the plate 19 on lifting the stem 27 from it and opens the valves 18 so that there chambers 7 are automatically placed in communication with the passage 15 for filling all of the chambers from the one having the neck 25.

The details of structure shown and described may be variously changed and modified without departing from the spirit and scope of my invention.

I claim as my invention:

1. A multiple gauge having a plurality of liquid reservoir chambers, a plurality of gauge glasses, one connected with each of said chambers, and means connecting said chambers whereby they may be filled simultaneously.

2. A multiple gauge having a plurality of liquid reservoir chambers, a plurality of gauge glasses, one connected with each of said chambers, and means connecting said chambers whereby they may be filled simultaneously from one of the same.

3. A multiple gauge having a plurality of liquid reservoir chambers, a plurality of gauge glasses, one connected with each of said chambers, a filling conduit common to all of said chambers and having ports for each of the same, and valve means for opening and closing the ports of all but one of said chambers.

4. A gauge having a plurality of liquid reservoir chambers, a plurality of gauge glasses, one connected with each of said chambers, a filling conduit common to all of said chambers and having ports for each of the same, a removable cap for one of said chambers, and valve means for the ports of the other chambers and operating to open and close their ports in the taking off and putting on of said cap.

5. A gauge having a plurality of liquid reservoir chambers, a plurality of gauge glasses, one connected with each of said chambers, a filling conduit common to all of said chambers and having ports for each of the same, a removable cap for one of said chambers, needle valves for the ports of the other chambers, a spring pressed plate at the upper ends of said chambers and connected with said valves, and a stem carried by the cap for depressing the plate to close the valves on putting on the cap and permitting the plate to rise to open the valves on removal of said cap.

6. In a gauge of the character described, a block having a plurality of separate liquid reservoir chambers, a filling conduit in said block beneath said chambers and having ports for each of the same, a cap for one of said chambers, needle valves for the ports of the other chambers, said block having a slot extending between the upper ends of said chambers, a spring pressed plate hinged in said slot and connected with said valves, and a stem carried by said cap for depressing the plate to close the valves on putting on the cap and permitting the plate to rise to open the valves on removal of said cap.

7. In a gauge of the character described, a block having a plurality of separate liquid reservoir chambers, a filling conduit in said block beneath said chambers and having ports for each of the same, a cap for one of said chambers, and valve means for the ports of the other chambers and including a plate with one side edge working in a V-shaped groove in said block, said valve means being opened and closed through the cap in the taking off and putting on of the same.

In testimony whereof I affix my signature this 30th day of January, 1926.

LEWIS M. ELLISON.